(12) United States Patent
Benner et al.

(10) Patent No.: US 6,217,138 B1
(45) Date of Patent: Apr. 17, 2001

(54) FRAME SECTION FOR A SWITCHING CABINET RACK

(75) Inventors: Rolf Benner, Herborn-Amdorf; Martina Köhler, Herborn; Udo Münch, Sinn; Wolfgang Reuter, Burbach, all of (DE)

(73) Assignee: Rittal-Werk Rudolf Loh GmbH & Co. KG, Herborn (DE)

( * ) Notice: Subject to any disclaimer, the term of this patent is extended or adjusted under 35 U.S.C. 154(b) by 0 days.

(21) Appl. No.: 09/308,352

(22) PCT Filed: Nov. 6, 1997

(86) PCT No.: PCT/EP97/06149

§ 371 Date: May 18, 1999

§ 102(e) Date: May 18, 1999

(87) PCT Pub. No.: WO98/23008

PCT Pub. Date: May 28, 1998

(30) Foreign Application Priority Data

Nov. 19, 1996 (DE) ............................................... 196 47 754

(51) Int. Cl.[7] .................................................. A47G 29/00
(52) U.S. Cl. ........................ 312/265.4; 211/189; 211/182
(58) Field of Search ..................................... 211/189, 190, 211/191, 182; 312/265.1, 265.2, 265.3, 265.4, 223.1

(56) References Cited

U.S. PATENT DOCUMENTS

| | | |
|---|---|---|
| 4,643,319 | 2/1987 | Debus et al. . |
| 5,333,950 | 8/1994 | Zachrai . |

FOREIGN PATENT DOCUMENTS

| | | |
|---|---|---|
| 20 43 699 | 3/1972 | (DE) . |
| 33 44 598 | 9/1984 | (DE) . |
| 41 40 072 | 6/1993 | (DE) . |
| 42 44 143 | 7/1994 | (DE) . |
| 43 36 285 | 4/1995 | (DE) . |
| 296 01 867 U | 8/1996 | (DE) . |

Primary Examiner—Peter M. Cuomo
Assistant Examiner—Jerry A. Anderson
(74) Attorney, Agent, or Firm—Pauley Petersen Kinne & Fejer

(57) ABSTRACT

A frame section for a switching cabinet rack having at least one inner wall which faces the inside area of the switching cabinet and is fitted with a row of regularly spaced fastening cavities. The fastening cavities do not reduce rigidity to any significant degree. At the same time fixtures can be mounted on the fastening cavities in a stable manner by designing the fastening cavities as slotted openings with clear openings larger in the longitudinal direction of the frame section than the width of the clear openings perpendicular to the longitudinal direction.

3 Claims, 2 Drawing Sheets

FRAME SECTION FOR A SWITCHING CABINET RACK

BACKGROUND OF THE INVENTION

1. Field of the Invention

This invention relates to a frame section for a rack of a switchgear cabinet having at least one interior wall facing an interior of the switchgear cabinet, which has at least one row of fastening receivers cut at even distances.

2. Description of Prior Art

A rack of this type is described in German Patent Reference DE 33 44 598. The rack has twelve identical frame sections, which are connected with each other. The frame sections support two interior walls, which are connected with each other at right angles. A row of fastening receivers is cut into each of these interior walls. The fastening receivers are formed by holes with an essentially square cross section.

SUMMARY OF THE INVENTION

It is one object of this invention to provide a frame section of the type mentioned at the outset, wherein impairment of the stiffness because of the fastening receivers is small and wherein a stable installation of built-in units at the fastening receivers is possible.

In accordance with this invention this object is achieved with fastening receivers embodied as slit-shaped holes, having a clear opening width in a longitudinal direction of the frame section greater than a clear opening width transversely to the longitudinal direction.

The longitudinally oriented slit-shaped fastening receivers affect only slightly the stiffness, in particular the distortion resistance, of the frame section. Because the fastening receivers extend in the longitudinal direction of the frame section, a stable attachment of built-in units is possible. Fastening elements of a structural height, which is matched to the clear opening width in the longitudinal direction of the frame section, can be supported in the fastening receivers. Because a large opening width is provided, the fastening elements can also have a correspondingly massive dimension in the longitudinal direction of the frame section. The main load axis when attaching built-in units now extends along the frame section in such a way that the fastening element introduced into the fastening receiver can optimally absorb the occurring load.

Therefore the result is a frame section having a high degree of stiffness achieved by special dimensioning of the fastening receivers. The solid attachment of built-in units on the fastening receivers is also possible.

When dimensioning the fastening receivers, the clear opening width of the fastening receivers in the longitudinal direction of the frame section should be at least twice as large as the opening width transversely to the longitudinal direction. The most diverse fastening elements can be fixed in place in the fastening receivers. The employment of hook-shaped fastening elements is advantageous. Mounting rails can be used as built-in units, for example, and be bent from sheet metal. In this case the hook-shaped fastening element is punched out of the sheet metal. The clear opening width transversely to the longitudinal direction of the frame section is then matched to the thickness of the sheet metal. It is therefore possible to provide a simple and cost-effective connecting mechanism due to the slit-shaped fastening receivers.

In a preferred embodiment of this invention two interior walls, which extend at right angles to each other, face the interior of the switchgear cabinet, and a further profiled side embodied as an interior wall is connected at right angles with the interior walls. Each one of the interior walls/profiled sides has a row of fastening receivers. A plurality of fastening possibilities is provided by this frame section, which can be used depending on the space availability in an interior of the switchgear cabinet. In particular, one profiled side is always parallel in relation to an interior wall, resulting in two levels of fastening, which extend parallel with each other. The number of attachment possibilities for built-in units can also be easily increased because the interior wall facing the interior of the switchgear cabinet respectively has at least one further row of fastening receivers. The rows of fastening receivers extend parallel with respect to each other. It is conceivable in connection with a rack assembled from the frame legs in accordance with this invention, that the horizontal frame sections, which form a bottom frame and a cover frame, have two rows of fastening receivers on an interior wall extending vertically with respect to the side of the rack. At least the row of fastening receivers facing the side of the rack forms the slit-shaped holes, and the rows of fastening receivers transition into the rows of fastening receivers of the vertical frame sections. Because the rows of fastening receivers of the horizontal frame sections transition into the vertical frame sections, built-in units can be fastened in the corners. It is an advantage if the fastening receivers transition into each other in a grid layout.

BRIEF DESCRIPTION OF THE DRAWINGS

This invention will be explained in greater detail by referring to an exemplary embodiment represented in the drawings wherein.

DESCRIPTION OF PREFERRED EMBODIMENTS

Figure 1:
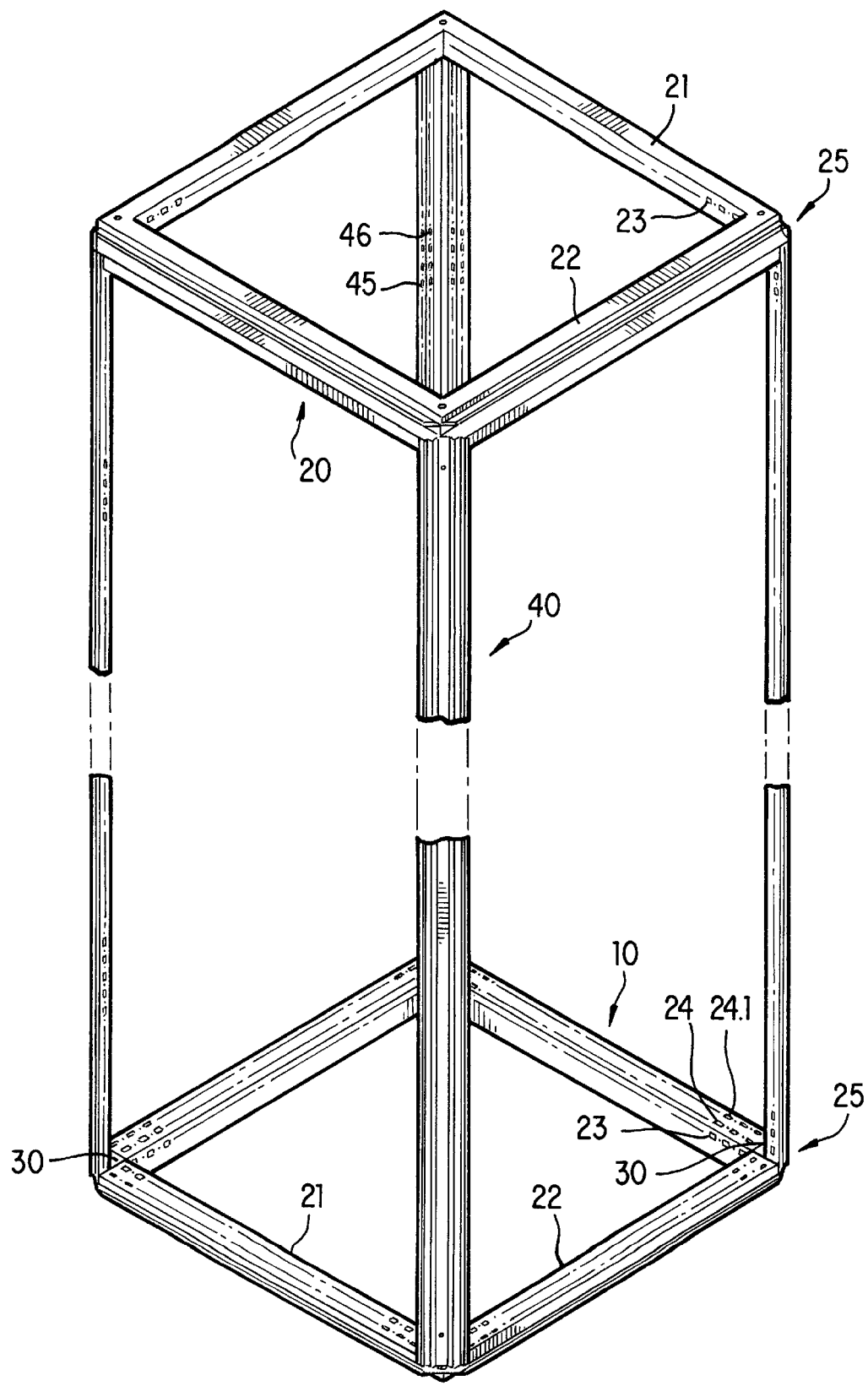
FIG. 1 shows a rack for a switchgear cabinet, having frame sections, in a perspective lateral view.

A rack for a switchgear cabinet is shown in FIG. 1. The rack is essentially assembled from a bottom frame 10, a cover frame 20 and four vertical frame sections 40. The vertical frame sections 40 connect the bottom frame 10 with the cover frame 20. The bottom frame and cover frame 10 and 20 are identically constructed, so that they can be interchanged.

The bottom frame and cover frame 10 and 20 each have four horizontal frame sections 21, 22, which are arranged at right angles with respect to each other. On interior walls facing the interior of the rack, the frame sections 21, 22 have rows of fastening receivers 23, 24, 24.1. The vertical frame sections 40 also have fastening receivers 45, 46, which are facing an interior of the rack. Threaded receivers 24.2, or respectively 44, are arranged between the individual fastening receivers 23, 24, 24.1, 45, 46.

The vertical frame sections 40 are connected with the bottom, or respectively cover frame 10, 20 by connectors 30. The connectors 30 are arranged in the area of corner receivers 25 of the bottom, or respectively cover frame 10, 20. Screw connections or welds, for example, are for fastening the vertical frame sections 40 on the connector 30.

Figure 2:
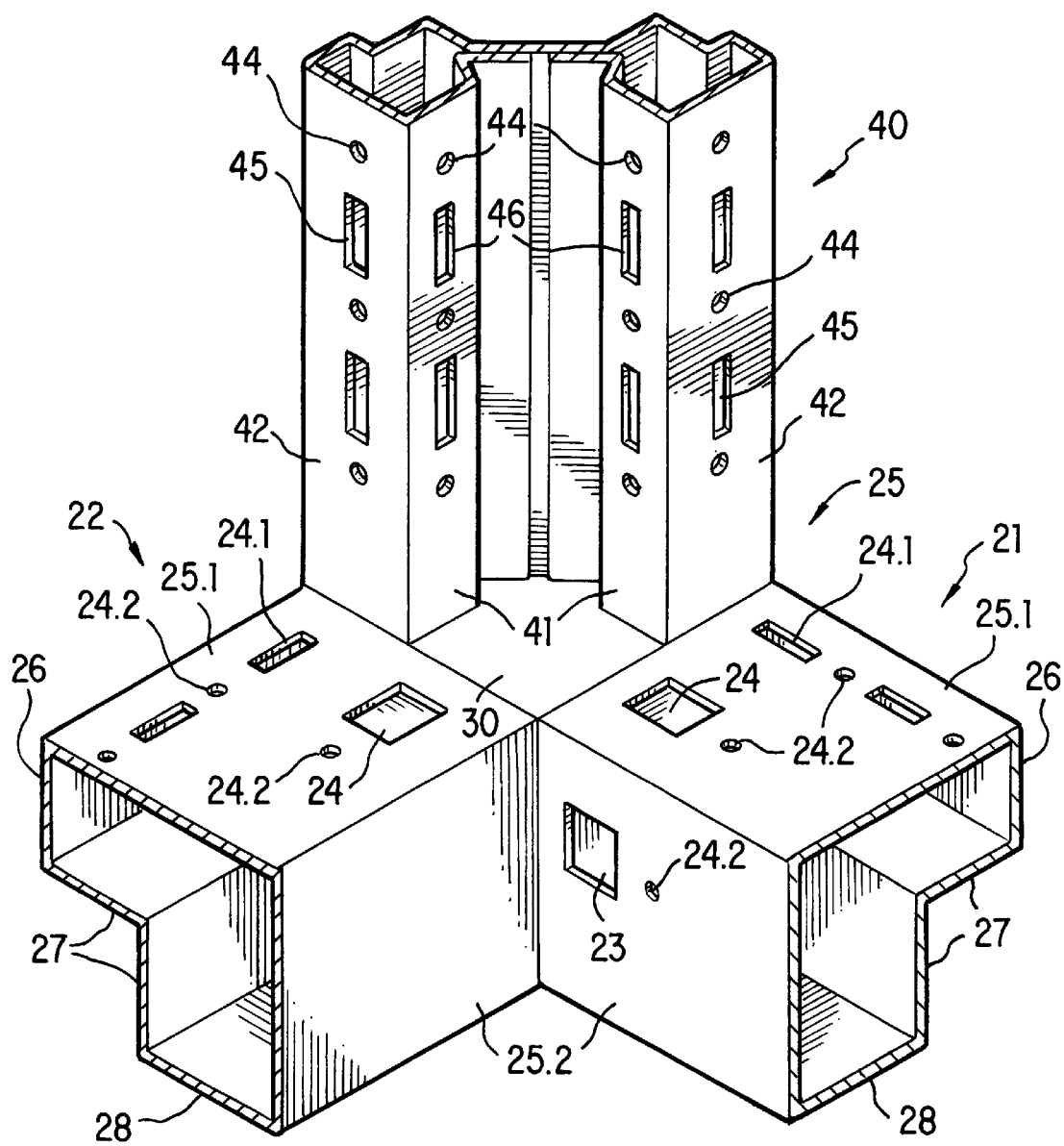
FIG. 2 shows a detailed representation of a corner area of the rack in accordance with FIG. 1.

A corner area of the rack in accordance with FIG. 1 is shown in greater detail in FIG. 2.

FIG. 2 shows the two horizontal frame sections 21, 22 identically constructed. Facing the interior of the rack, the two interior walls 25.1, 25.2 are connected at right angles to each other. The horizontal, upward facing interior wall 25.1 makes a transition into a bevel 26. The bevel 26 extends parallel with the side of the rack. Lateral walls or a cabinet door can be placed against bevel 26, with a seal between them. The bevel 26 makes a transition into two exterior walls 27, which are also placed at right angles to each other. Thus the exterior walls 27 are arranged parallel with respect to the interior walls 25.1, 25.2. A bevel of the lateral wall, or respectively of the cabinet door, can be received in the area formed by the setoff of the two exterior walls 27. The vertical exterior wall 27 is connected with the vertical interior wall 25.2 via the bottom 28, so that a closed hollow profile results for the horizontal frame sections 21, 22.

The vertical interior wall has a row of fastening receivers 23. The fastening receivers 23 are embodied as holes of essentially rectangular cross section. Two rows of fastening receivers 24, 24.1 are provided on the upward facing horizontal interior wall. The two rows of fastening receivers extend parallel with each other in the longitudinal direction of the frame section 21, 22. While the fastening receivers 24 located on the inside are identical to the fastening receivers 23 of the vertical interior wall 25.2, the fastening receivers 24.1 are slit-shaped. The slit-shaped fastening receivers 24.1 have a clear opening width in the longitudinal direction of the frame sections 21, 22 which is greater than the opening width transversely to the longitudinal direction. Threaded receivers 24.2 are respectively arranged between the individual fastening receivers 23, 24, 24.1. The threaded receivers 24.2 are stamped out in an untrimmed shape, into which tapping screws can be screwed.

The horizontal frame sections 21, 22 are connected at right angles to each other and form the corner receiver 25, which is open toward the outside. The vertical frame section 40 is placed against the connector 30 in the corner receiver 25.

The vertical frame section 40 has four interior walls 41, 42. The interior walls 41 are at right angles to each other and form an interior receiver facing the interior of the rack. Vertically extending mounting rails can be fastened in the interior receiver. The two interior walls 42, which are embodied as profiled sides, are connected at right angles to the two interior walls 41. The interior walls 42 also extend at right angles with the sides of the rack. Each one of the interior walls 41, 42 has a row of fastening receivers 45, 46. The fastening receivers 45, 46 are also embodied in a slit-shaped manner, the same as the fastening receivers 24.1 of the horizontal frame sections 21, 22, wherein the main direction of extension runs in the longitudinal direction of the frame section 40. On the exterior of the rack, the interior walls 42 terminate flush with the interior walls 25.1 of the horizontal frame sections 21, 22. Since the fastening receivers 24.1 of the horizontal frame sections 21, 22 and the fastening receivers 45 of the vertical frame sections are spaced apart at a same distance from the sides of the rack, the fastening receivers 24.1, 45 transition into each other. Therefore a circumferential fastening frame results. The fastening receivers 24 can transition in the same way into the fastening receivers 46 of the interior wall 41.

As shown in the drawings, a small structural size of the individual frame sections 21, 22, 40 can be realized by means of the narrow fastening receivers 24.1, 45, 46. Also, the fastening receivers 24.1, 45, 46 hardly weaken the frame sections 21, 22, 40, so that the frame sections 21, 22, 40 have great rigidity. At the same time it is possible to fasten built-in units solidly on the fastening receivers 24.1, 45, 46. A large degree of flexibility is provided by the multitude of fastening possibilities for the attachment of built-in units in the interior of the switchgear cabinet. It is possible to form two vertical fastening levels, one behind the other, with the four interior walls 41, 42 of the vertical frame sections 40 in the direction of the one horizontal frame section 21, as well as the other frame section 22. Thus, the fastening levels are respectively formed by one interior wall 41 and a further interior wall 42.

What is claimed is:

1. In a frame section for a rack of a switchgear cabinet having vertical frame legs and horizontal frame legs, the improvement comprising: each of the vertical frame legs (40) having two interior walls (41) positioned at right angles with respect to each other and facing an interior of the switchgear cabinet, a plurality of profile sides (42), each of interior walls (41) connected at a right angle to one of the profile sides (42), each of the interior walls (41) and each of the profile sides (42) having at least one row of first fastening receivers (45, 46) spaced at even distances, the first fastening receivers (45, 46) formed as slit-shaped holes, the horizontal frame legs (21, 22) forming a bottom frame (10) and a top frame (20), each of the horizontal frame legs (21, 22) having a row of second fastening receivers (24) and a row of third fastening receivers (24.1) in an inner wall (25.1), each of the slit-shaped holes having a first dimension in a longitudinal direction of the frame section (40) greater than a second dimension positioned transversely to the longitudinal direction, and one of the rows of the first fastening receivers (45, 46) transitioning into one of the rows of second fastener receivers or the third fastening receivers (24.1).

2. In the frame section in accordance with claim 1, wherein the first dimension of the first fastening receivers (45, 46) is at least twice as large as the second dimension.

3. In the frame section in accordance with claim 2, wherein the row of second fastening receivers (24) extend parallel with the row of third fastening receivers (24.1).

* * * * *